US008989036B2

(12) United States Patent
Craig et al.

(10) Patent No.: US 8,989,036 B2
(45) Date of Patent: Mar. 24, 2015

(54) UPLINK LOAD PREDICTION USING KALMAN FILTERS

(75) Inventors: Stephen Craig, Nacka (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 214 days.

(21) Appl. No.: 13/579,414

(22) PCT Filed: Mar. 23, 2010

(86) PCT No.: PCT/SE2010/050314

§ 371 (c)(1),
(2), (4) Date: Aug. 16, 2012

(87) PCT Pub. No.: WO2011/119075

PCT Pub. Date: Sep. 29, 2011

(65) Prior Publication Data

US 2012/0314607 A1    Dec. 13, 2012

(51) Int. Cl.
*H04W 36/30* (2009.01)
*H04B 17/00* (2006.01)
(Continued)

(52) U.S. Cl.
CPC ........... *H04B 17/006* (2013.01); *H04W 52/241* (2013.01); *H04L 43/0882* (2013.01); *H04W 52/343* (2013.01); *H04W 52/40* (2013.01)
USPC ........... 370/252; 370/335; 370/320; 370/342; 370/329; 455/69; 455/522; 455/525

(58) Field of Classification Search
CPC ............ H04B 17/006; H04L 43/0882; H04W 52/241; H04W 52/343; H04W 52/40
USPC .................. 370/252, 278, 329, 335, 320, 342
See application file for complete search history.

(56) References Cited

U.S. PATENT DOCUMENTS 5,839,056 A * 11/1998 Hakkinen ........................ 455/69
6,128,506 A * 10/2000 Knutsson et al. ............. 455/522
(Continued)

FOREIGN PATENT DOCUMENTS

EP    1564912 A1    8/2005
WO    0180581 A1    10/2001
(Continued)

OTHER PUBLICATIONS

International Search Report and Written Opinion for PCT/SE2010/050314, mailed Dec. 10, 2010.
(Continued)

*Primary Examiner* — Andrew Lai
*Assistant Examiner* — Mahmudul Hasan
(74) *Attorney, Agent, or Firm* — Withrow & Terranova, PLLC

(57) ABSTRACT

Method and arrangement in a base station for providing an input parameter in an algorithm for predicting uplink load in a cell in a wireless communication system. The cell comprises at least one user equipment. The method comprises obtaining SIR target value associated with the user equipment, measuring SIR value on a signal sent from the user equipment, comparing the difference between the obtained SIR target value and the measured SIR value with a threshold limit value, selecting the SIR value as input parameter in the uplink load prediction algorithm for the user equipment, if the difference between the obtained SIR target value and the measured SIR value is bigger than the threshold limit value. Otherwise selecting the SIR target value as input parameter in the uplink load prediction algorithm for the user equipment.

12 Claims, 6 Drawing Sheets

(51) Int. Cl.
*H04W 52/24* (2009.01)
*H04L 12/26* (2006.01)
*H04W 52/34* (2009.01)
*H04W 52/40* (2009.01)

(56) References Cited

U.S. PATENT DOCUMENTS

| | | | |
|---|---|---|---|
| 2002/0115459 A1* | 8/2002 | Chuang et al. | 455/522 |
| 2004/0058699 A1* | 3/2004 | Jonsson et al. | 455/522 |
| 2006/0223446 A1* | 10/2006 | Dominique et al. | 455/69 |
| 2008/0014978 A1* | 1/2008 | Kaneko et al. | 455/522 |
| 2009/0149134 A1* | 6/2009 | Gunnarsson et al. | 455/69 |
| 2009/0258651 A1* | 10/2009 | Sagfors et al. | 455/442 |
| 2010/0103046 A1* | 4/2010 | Smith et al. | 342/386 |
| 2011/0009150 A1* | 1/2011 | Cairns | 455/522 |
| 2012/0020228 A1* | 1/2012 | Ding et al. | 370/252 |

FOREIGN PATENT DOCUMENTS

| | | | | |
|---|---|---|---|---|
| WO | 2005/117363 A1 | 12/2005 | | |
| WO | 2008/076050 A2 | 6/2008 | | |
| WO | WO 2008/076050 | * | 6/2008 | H04B 7/005 |
| WO | 2009/035381 A1 | 3/2009 | | |

OTHER PUBLICATIONS

International Preliminary Report on Patentability for PCT/SE2010/050314, mailed Apr. 16, 2012.

European Search Report for Patent Application No. 10848560.8, mailed Jul. 10, 2013, 4 pages.

* cited by examiner ized site, it may be referred to as softer handover. This technique is a form of user equipment-assisted handover, for user equipments which continuously make power measurements of a list of neighbouring cell sites. It is then determined whether or not to request or end soft handover with the cell sectors on the list.

UPLINK LOAD PREDICTION USING KALMAN FILTERS

This application is a 35 USC 371 national phase filing of International Application No. PCT/SE2010/050314, filed Mar. 23, 2010, the disclosure of which is incorporated herein by reference in its entirety.

TECHNICAL FIELD

The present invention relates to a method and arrangement in a base station. In particular, it relates to a mechanism for selecting an input parameter for a load prediction algorithm.

BACKGROUND

The load estimation/load prediction functionality of the enhanced uplink (EUL) scheduling function is needed to assess the predicted uplink air interface load, given a tentative scheduling decision. In the Wideband Code Division Multiple Access (WCDMA) cellular system users can be added to the EUL channel up to the point where the uplink load reaches the scheduling threshold. This scheduling threshold is determined from two requirements: the load allowed, so as not to impair the planned coverage and the load allowed, so as not to impair cell stability.

The load affecting the coverage can be obtained as the Rise over Thermal (RoT). This measure is obtained by measuring the total received WCDMA wideband power and dividing this with the thermal noise floor. The total wideband power consists of the noise floor power plus neighbour cell interference plus normal power controlled traffic in the cell, plus the scheduled enhanced uplink traffic. The load allowed, so as not to impair cell stability, does not include the neighbour cell interference—simply because that power is not controlled by the present cell and that power can therefore not cause instability, at least not as a first approximation.

It may be distinguished between the situation where the load is measured ("now") and predicted ("evaluation of tentative EUL scheduling decisions"). The present solution relates to the latter case, with load prediction.

In case of load prediction, e.g. for stability, the predicted load factor is computed from the measured Signal to Interference Ratio (SIR) on the control channel, and from power factors (beta factors) that express and add the data channel power to the control power, to arrive at a total predicted load power for a user. These predicted powers are then summed up as load factors, and compared to the thresholds to see if the tentative scheduling decision is feasible or not.

The WCDMA enhanced uplink aims at scheduling traffic to times when the uplink interference situation is favourable, thereby utilizing air interface resources in a better way than before. The air interface load is measured by the noise rise, over the thermal level, a quantity denoted rise over thermal (RoT). This idea is illustrated in FIG. 1.

FIG. 1 illustrates the air interface load according to prior art. The pole capacity is the limiting theoretical bit rate of the uplink, corresponding to an infinite noise rise.

The noise rise may be seen as the total received power relative to the noise power within a cell. The noise rise is increasing with the number of user equipments and/or radio traffic intensity within the cell.

The uplink data channel is denoted Enhanced Dedicated Channels (E-DCH) Dedicated Physical Data Control Channel (E-DPDCH). This channel supports a high rate. It is however not involved in the scheduling control as such, this is the task of the corresponding control channel, denoted Enhanced Dedicated Channels (E-DCH) Dedicated Physical Control Channel E-DPCCH. This channel e.g. carries rate requests (measurement signals) from the user equipments to the EUL scheduler, situated at the base station. There are also some downlink channels supporting EUL. The first of these is the Enhanced Dedicated Channels (E-DCH) Absolute Grant Channel (E-AGCH) channel which carries absolute grants (control signals) to each user equipment. More peripheral is the E-DCH Relative Grant Channel (E-RGCH) channel which carries relative grants (also control signals) from the base station to the user equipment. Finally, the E-DCH Hybrid automatic repeat request (HARQ) Acknowledgement Indicator Channel (E-HICH) channel carries acknowledgment/non-acknowledgment (ACK/NACK) information and is not directly involved in the present solution.

The grants mentioned above are the quantities signalled to the user equipment indicating what rate (actually power) it may use for its transmission. The user equipment can, but need not, use its complete grant. Relative grants are used to control the interference in neighbour cells. These can only decrease the current grant of the user equipment one step. It is stressed that there are only a discrete number of grant levels that can be used.

The task of the scheduler is to schedule EUL user traffic, to enhance user and cell capacity, at the same time as it keeps track of the air interface cell load, avoiding over-scheduling that may cause cell instability and loss of coverage. Also, the scheduler keeps track of other available traffic, like transport resources and hardware. Further, the scheduler receives, measures and estimates quantities relevant for its scheduling operation. In addition, the scheduler also transmits orders to user equipments, primarily in the form of granted power/bitrates.

The present solution mainly relates to the scheduling of EUL user traffic, to enhance user and cell capacity, at the same time as it keeps track of the air interface cell load, avoiding over-scheduling. In particular to the load prediction step needed to evaluate tentative scheduling decisions.

US 2004/0252666 A1 discuss a method for managing uplink radio resources in a CDMA communication system, based on determining the interference level into the primary base station, determining a contribution of secondary cell connections to the interference level and computing a proportionality factor for adjusting a reference interference level relative to the interference level.

A problem when performing load prediction is due to the fact that the SIR measurement in WCDMA is noisy. This causes the predicted effect of the tentative scheduling decision to vary quite a lot between adjacent sampling times. This in turn affects the scheduler in a negative way, preventing an optimal use of available uplink air interface resources.

A further problem that may occur under certain conditions is that when the user equipment is in soft(er) handover, conflicting power control commands may result since both base stations try to control the transmit power of the user equipment.

Soft handover refers to a feature used by e.g. the CDMA and WCDMA standards, where a user equipment is simultaneously connected to two or more cells, or cell sectors, during a call. If the sectors are from the same physical cell site, i.e. a sectorised site, it may be referred to as softer handover. This technique is a form of user equipment-assisted handover, for user equipments which continuously make power measurements of a list of neighbouring cell sites. It is then determined whether or not to request or end soft handover with the cell sectors on the list.

As a result the mean value of the measured SIR and the commanded SIR target may start to drift apart in the serving cell. In such a situation it will be required to resort to the measured SIR for load estimation. The problem is that it is non-trivial to determine when a statistically significant difference exists between the target SIR and the measured SIR, when in soft(er) handover—the reason for this being the very noisy SIR measurement.

SUMMARY

It is therefore an object of the present invention to obviate at least some of the above disadvantages and provide an improved performance in a wireless communication system.

According to a first aspect of the present invention, the object is achieved by a method in a base station. The method aims at providing an input parameter in an algorithm for predicting uplink load in a cell in a wireless communication system. The cell comprises at least one user equipment. The method comprises obtaining a Signal-to-Interference Ratio (SIR) target value associated with the user equipment. Also, the method further comprises measuring a Signal-to-Interference Ratio SIR value on a signal sent from the user equipment and comparing the difference between the obtained SIR target value and the measured SIR value with a threshold limit value. If the difference between the obtained SIR target value and the measured SIR value is bigger than the threshold limit value, then the SIR value is selected as input parameter in the uplink load prediction algorithm for the user equipment. Otherwise the SIR target value is selected as input parameter in the uplink load prediction algorithm for the user equipment.

According to a second aspect of the present invention, the object is achieved by an arrangement in a base station for providing an input parameter in an algorithm for predicting uplink load in a cell in a wireless communication system. The cell comprises at least one user equipment. The arrangement comprises an obtaining unit. The obtaining unit is configured to obtain a Signal-to-Interference Ratio (SIR) target value associated with the user equipment. Further, the arrangement comprises a measurement unit. The measurement unit is configured to measure a Signal-to-Interference Ratio (SIR) value on a signal sent from the user equipment. In addition, the arrangement comprises a comparison unit. The comparison unit is configured to compare the difference between the obtained SIR target value and the measured SIR value with a threshold limit value. Additionally, the arrangement comprises a selecting unit. The selecting unit is configured to select the SIR value as input parameter in the uplink load prediction algorithm for the user equipment, if the difference between the obtained SIR target value and the measured SIR value is bigger than the threshold limit value. Otherwise, the SIR target value is selected as input parameter in the uplink load prediction algorithm for the user equipment.

By replacement of the measured SIR, with the SIR target value commanded by the outer power control loop, the noisiness of the measured SIR is avoided as the SIR target value is not a measured value, but a computed value, which is seldom updated. Due to a steadier load prediction for the EUL scheduler, the cell throughput may be improved with about 10%, which leads to an improved performance in the wireless communication system.

Further, by applying a first KALMAN filtering step, optimal estimates of the target SIR, the measured SIR and/or the difference between the two are provided. In addition the Kalman filter provides a measure of the uncertainty distribution, of the estimates. Together, this statistical information allows for improved detection schemes to be applied to determine when there is a statistically significant difference between the target SIR and the measured SIR. Thus, problems related to conflicting power control commands that may result in soft(er) handover since both base stations try to control the transmit power of the user equipment may be decreased, leading to a further improved performance in the wireless communication system as the present solution is applicable under different transmission conditions including soft(er) handover.

It is stressed that the benefits of the invention are substantial, with almost a 10% increase of performance.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and arrangement in a base station, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1:
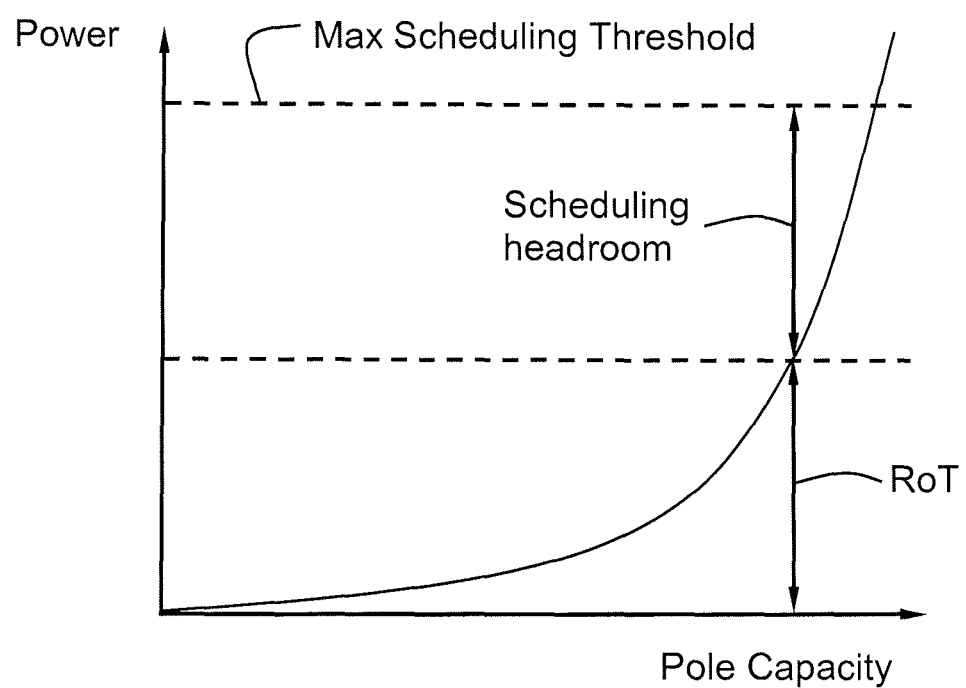
FIG. 1 illustrates the air interface load according to prior art.
Figure 2:
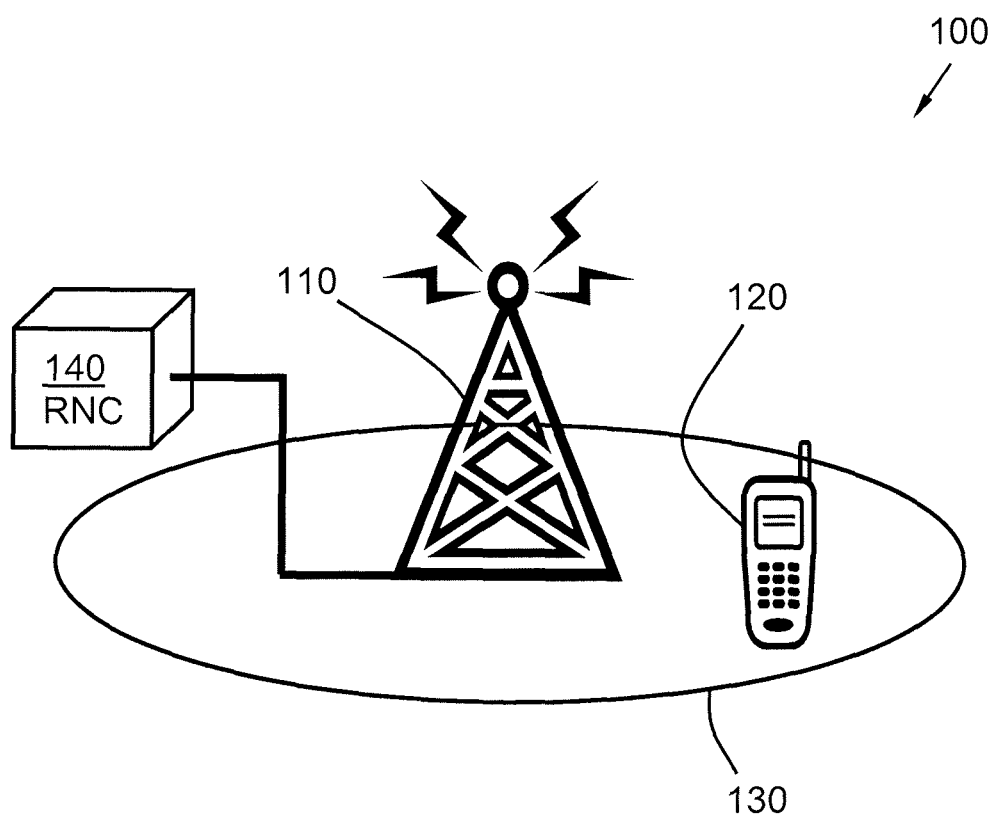
FIG. 2 is a schematic block diagram illustrating a wireless communication system according to some embodiments.

FIG. 2 depicts a wireless communication system 100, such as e.g. 3rd Generation Partnership Project (3GPP) Long Term Evolution (LTE), LTE-Advanced, Evolved Universal Terrestrial Radio Access Network (E-UTRAN), Universal Mobile Telecommunications System (UMTS), Global System for Mobile communications/Enhanced Data rate for GSM Evolution (GSM/EDGE), Code-Division-Multiple-Access (CDMA) networks, Wideband Code Division Multiple Access (WCDMA), Worldwide Interoperability for Microwave Access (WiMax), or Ultra Mobile Broadband (UMB), just to mention some few options.

In the following, the present methods and arrangements are further elaborated with specific reference to WCDMA systems. Thus the wireless communication system 100 is described as a WCDMA system throughout the rest of the description, for enhanced comprehension and readability. However, it is obvious to a skilled person that corresponding concepts could also be applied in other wireless communication systems 100.

The wireless communication system 100 comprises a base station 110 and a user equipment 120 situated in a cell 130. The base station 110 and the user equipment 120 are configured to communicate wirelessly with each other. The base station 110 is connected to a control unit 140.

A plurality of user equipments 120 may be present simultaneously in the same cell 130, but for clarity reasons, only one user equipment 120 is depicted in FIG. 2. These simultaneously present user equipments 120 could under certain circumstances interfere with each other, why power control may be applied to adjust the transmission power of the user equipment 120.

Uplink radio signals may be sent from the user equipments 120 over a radio link and is received by the base station 110. The power of the signal, which may be too high or too low to be suitable for the base station 110, is adjustable by the base station 110. Such adjustment of the power of a signal received from the user equipment 120 may in some embodiments be performed partly in the radio network controller 140 and partly in the base station 110. In some embodiments may such adjustment of the power of a signal received from the user equipment 120 be performed entirely in the radio network controller 140.

The purpose of the illustration in FIG. 2 is to provide a general overview of the environment in which the present solution is intended to operate.

The base station 110 may be referred to as e.g. a NodeB, an evolved Node B (eNB, or eNode B), a base transceiver station, Access Point Base Station, base station router, or any other network node configured for communication with the user equipment 120 over a wireless interface, depending e.g. of the radio access technology and terminology used. In the rest of the description, the term "base station" will be used for the base station 110, in order to facilitate the comprehension of the present methods and arrangements.

The user equipment 120 may be represented by e.g. a wireless communication terminal, a mobile cellular phone, a Personal Digital Assistant (PDA), a wireless platform, a laptop, a computer or any other kind of device capable to communicate wirelessly with the base station 110.

The base station 110 is connected to the control unit 140. The control unit 140 may be e.g. a Radio Network Controller (RNC). The control unit 140 is a governing element in the wireless communication network 100, responsible for control of base stations 110, which are connected to the control unit 140. The control unit 140 may carry out radio resource management and e.g. some of the mobility management functions, according to some embodiments. The control unit 140 is in FIG. 2 depicted as separated from the base station 110. However, it is possible to imagine embodiments wherein the control unit 140 is a unit physically integrated within the base station 110.

The base station 110 controls at least some radio resource management within the cell 130, such as e.g. allocating radio resources to user equipment 120 within the cell and ensuring reliable wireless communication links between the base station 110 and the user equipment 120 e.g. by means of power control of the power of the signals emitted by the user equipment 120. The power control may be performed by running an inner power control loop and an outer power control loop, as will be further discussed and explained in association with FIG. 3.

However, the base station 110 is also, as previously discussed, scheduling user equipment 120 within the cell 130. In order to perform the scheduling, a prediction of the uplink load within the cell 130 is made in the base station 110, by running a load prediction algorithm, as previously explained.

The basic concept of the invention comprises replacing the measured SIR ($SIR_{est}$) with the commanded target SIR ($SIR_{target}$), of the outer power control loop, for load prediction purposes.

Further a filtering of SIR target and measured SIR may be performed in order to provide data in support of detection of statistically significant differences between SIR target and measured SIR, for load prediction purposes. The results of the optimal filtering may be used, in order to detect if a statistically significant difference exist between SIR target and the measured SIR, for load prediction purposes.

However, when the user equipment 120 is in a soft(er) handover situation, detected by means of computing a statistically significant difference between target SIR and measured SIR, a temporary switch of input parameter to the measured SIR is performed, for load prediction purposes.

Figure 3:
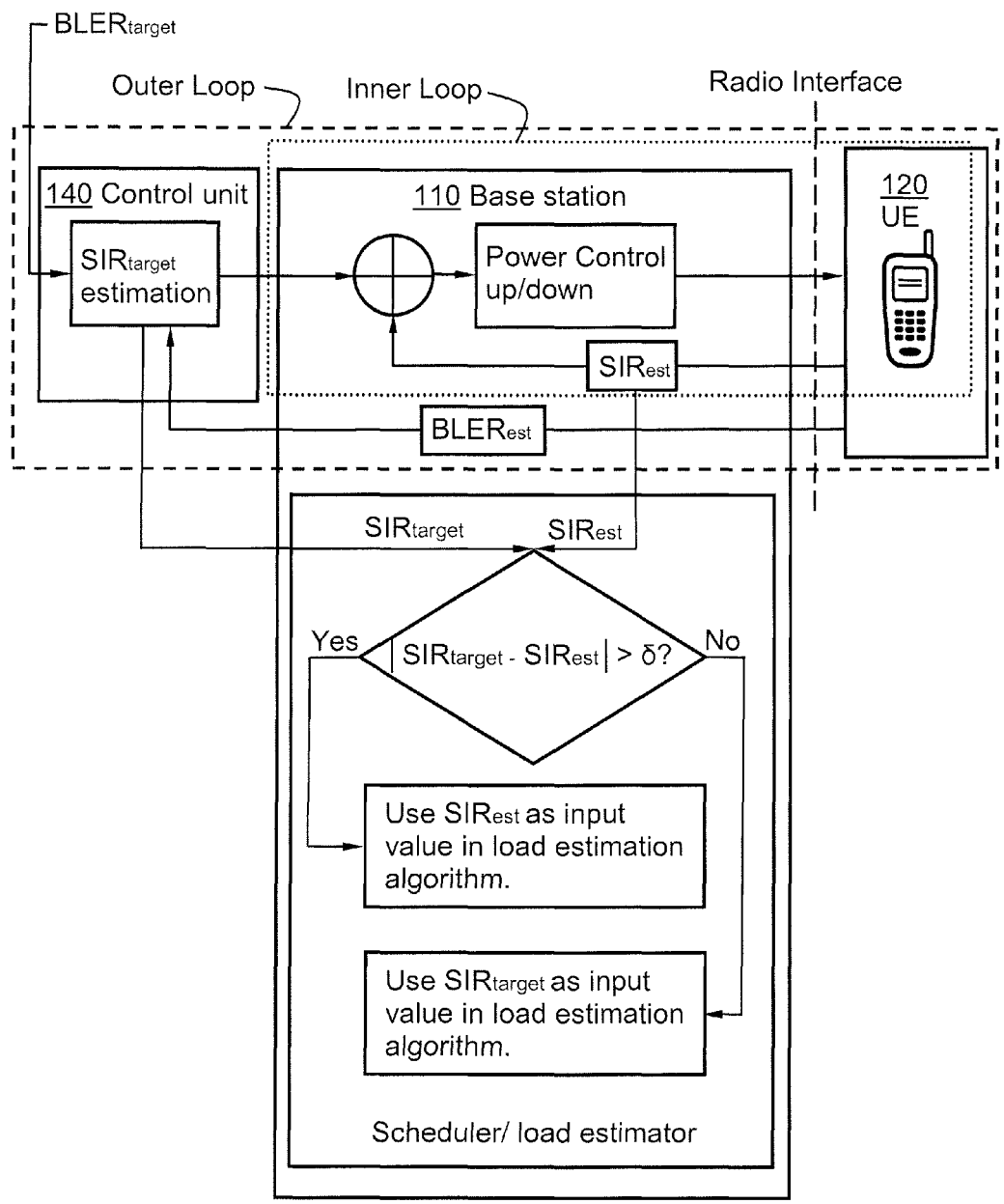
FIG. 3 is a block diagram illustrating an embodiment of the present method.

FIG. 3 schematically discloses the base station power control mechanism for adjusting the uplink transmission power of the user equipment 120, and also the mechanism for detecting a difference between SIR target and measured SIR, and selecting appropriate input value for the load prediction algorithm.

The power control arrangement according to FIG. 3 comprises the user equipment 120, the base station 110 and the control unit 140. However, the parts of the power control arrangement that in this embodiment is performed in the control unit 140 may optionally be performed in the base station 110 and vice versa.

Effective power control is an important aspect of the wireless communication system 100, e.g. so that signals transmitted by the user equipment 120 near to the base station 110 do not overpower the signals transmitted by other user equipments that are far from the base station 110. The power control mechanism is thus making it easier to meet a predetermined quality of service target on the radio link between the user equipment 120 and the base station 110. Thus, when the user equipment 120 is near to the base station 110, less power is required to maintain an acceptable Signal to Interference Ratio (SIR) than when the user equipment 120 is far from the base station 110. Effective power control in the uplink may also increase the battery life of the user equipment 120.

The power control mechanism in the wireless communication system 100 may be divided in an outer loop power control and an inner loop power control.

The outer loop power control monitors the connection quality and adjusts a SIR target for the connection. If the quality of the uplink signals e.g. estimated BLER, is too low, the SIR target is increased and if the quality is too high the SIR target is reduced. The SIR target is in turn used by the inner loop power control, comparing the SIR target with an estimated SIR value. The inner loop power control in the base station 110 also generates a power adjustment command for the user equipment 120, based on inter alia the comparison between the SIR target and the estimated SIR value.

The outer loop power control aims at, despite varying radio conditions, which is frequently the case in wireless communication systems 100, maintain the desired quality of service target. By means of example, the outer loop power control is situated in the control unit 140. It may however optionally be situated in the base station 110.

The outer loop power control may be used to maintain a certain link quality in terms of e.g. Frame Error Ratio (FER), BLock Error Ratio (BLER), Bit Error Ratio (BER), Packet Error Rate (PER) or any other suitable measure such as outage probability. Thus the quality target used according to the present method may be based on block or frame error rate, where the block or frame error rate is measured using e.g. Cyclic Redundancy Check (CRC). In this illustration, such measurement is performed in the control element. The quality target may also in some embodiments of the present method be based on TPC command error.

The quality target may be set by the network and it is expected from the user equipment 120 to consistently maintain this target to ensure that the desired quality of service is met throughout the communication session. The value of the quality target depends upon the type of service, such as speech, packet data, video data etc, which in turn impacts the SIR target used for the inner loop power control. Some exemplary values may be e.g. 1% BLER target for speech, 10% BLER target for packet data, 0.1 BLER % for video telephony and so on, just to mention some examples of possible BLER target values and their relation to different services.

The term "quality of service" refers to a resource reservation control mechanism. Quality of service may provide different priority to different users or data flows, or guarantee a certain level of performance to a data flow in accordance with e.g. the network operator's policy. Thus, an adequate power level for providing the quality target of the radio link may be easily achieved.

The inner loop power control may run every time slot of a radio frame and may typically be less than 1 ms. In WCDMA, the inner loop power control may typically run each ⅟₁₅ of the frame, e.g. 0.67 ms when the frame is 10 ms. Thus about 1 500 power adjusting commands may be sent each second, according to some embodiments. The inner loop power control run on signals sent from the user equipment 120 to be received by the base station 110, i.e. uplink signals. The aim of the uplink inner loop power control is to control the emitting power of the user equipment 120 so that e.g. interference on other user equipments transmissions may be reduced, while maintaining the SIR target.

The base station 120 estimates the SIR value e.g. on some known pilot symbols, e.g. in the control element comprised in the base station 120. The result is then compared with a SIR target corresponding to a given quality of service target e.g. certain BLER requirements, spreading factor used etc in the inner loop power control.

In e.g. WCDMA, SIR is normally measured on the dedicated physical control channel (DPCCH), which DPCCH comprises pilots and TPC commands for uplink power control.

If the estimated SIR value is less than the SIR target value then the inner loop power control at the base station 110 generates UP command and sends it to a power regulator comprised within the user equipment 120. And if the estimated SIR value is more than, or is equal to, the SIR target value then the inner loop power control at the base station 110 generates DOWN command and sends it to the power regulator comprised within the user equipment 120. In response, the user equipment 120 will increase, in case of UP command, or decrease, in case of DOWN command, its uplink transmit power, e.g. with 1 dB.

The power control according to the present method and arrangement also comprises a Scheduler/load estimator, which may be situated in the base station 110. The Scheduler/load estimator obtains the measured SIR and the SIR target. A comparison is then performed against a threshold value δ, which may be e.g. predetermined and/or distributed. If the difference between the measured SIR and the SIR target is bigger than the threshold value δ, the user equipment 120 may be considered to be in a soft(er) handover situation. Thus the measured SIR is selected to be used as input value when predicting the cell load, in order to arrive at a more appropriate prediction of the cell load. Otherwise, if the difference between the measured SIR and the SIR target is less than the threshold value δ, the SIR target is used as input value when predicting the cell load, for that user equipment 120.

An advantage of the described method and arrangements according to some embodiments is that it may be implemented in the base station 110 and used for any arbitrary user equipment 120 entering the cell 130. The user equipment 120 may not have to be modified in any way, which reduces the amount of work, effort and cost involved when implementing the present solution.

When the user equipment 120 is in soft(er) handover the target SIR and the measured SIR of the serving cell may differ due to conflicting power commands issued by the base stations of the multiple cells to which the user equipment 120 is connected. It is then required to back off and use measured SIR rather than the target SIR. Determining when this shall be done needs to be based on a comparison between the two values. The problem is only that the measured SIR is noisy. According to some embodiments, Kalman filtering may firstly be applied, in order to obtain refined estimates of the two quantities. As a side effect, said Kalman filtering also generates the covariance matrix of said estimates. Together, this information is sufficient to derive detectors for when the backoff may be applied.

The Kalman filter is a mathematical method using measurements that are observed over time that contain noise i.e. random variations and other inaccuracies, and produce values that tend to be closer to the true values of the measurements and their associated calculated values. The Kalman filter produces estimates of the true values of measurements and their associated calculated values by predicting a value, estimating the uncertainty of the predicted value, and computing a weighted average of the predicted value and the measured value. The most weight is given to the value with the least uncertainty. The estimates produced by the method tend to be closer to the true values than the original measurements because the weighted average has a better estimated uncertainty than either of the values that went into the weighted average.

The Kalman filtering may be based on a state space model that describes the evolution of the interesting quantities. A simple such model is given by:

$$x(t+T) = \begin{pmatrix} x^{SIRTarget}(t+T) \\ b(t+T) \end{pmatrix}$$

$$= \begin{pmatrix} 1 & 0 \\ 0 & 1 \end{pmatrix} \begin{pmatrix} x^{SIRTarget}(t) \\ b(t) \end{pmatrix} + \begin{pmatrix} w^{SIRTarget}(t) \\ w^{bias}(t) \end{pmatrix} \begin{pmatrix} y^{SIRTarget}(t) \\ y^{SIR}(t) \end{pmatrix}$$

$$= \begin{pmatrix} 1 & 0 \\ 1 & 1 \end{pmatrix} \begin{pmatrix} x^{SIRTarget}(t) \\ b(t) \end{pmatrix} + \begin{pmatrix} e^{SIRTarget}(t) \\ e^{SIR}(t) \end{pmatrix}$$

-continued $$R_1 = E\left[\begin{pmatrix} w^{SIRTarget}(t) \\ w^{bias}(t) \end{pmatrix} \begin{pmatrix} w^{SIRTarget}(t) & w^{bias}(t) \end{pmatrix}\right]$$

$$R_2 = E\left[\begin{pmatrix} e^{SIRTarget}(t) \\ e^{SIR}(t) \end{pmatrix} \begin{pmatrix} e^{SIRTarget}(t) & e^{SIR}(t) \end{pmatrix}\right] = \begin{pmatrix} 0 & 0 \\ 0 & E[e^{SIR}(t)]^2 \end{pmatrix}$$

Above, $x^{SIRTarget}(t)$ denotes the SIR target at time t, b(t) denotes the difference (bias) between the SIR target and $y^{SIR}(t)$ which is the measured SIR, as expressed by the measurement equation. The state equation is a standard random walk, where $w^{SIRTarget}(t)$ and $w^{biast}(t)$ are system noises, with covariance matrix $R_1$. The measurement noises are given by $e^{SIR}_{Target}(t)$ and $e^{SIR}(t)$, with measurement covariance matrix $R_2$. Note that the key point here is to realize that there is no error for the SIR target.

The Kalman filter may be directly applied to this model. The output of this filter in particular produces the quantities $\hat{x}^{SIRTarget}(t)$, $\hat{b}(t)$ and the corresponding covariance matrix. These are the quantities that may be used for the subsequent step. The filter is given by:

$$K_f(t)=P(t|t-T)C^T(t)(c(t)P(t|t-T)C^T(t)+R_2(t))^{-1}$$

$$\hat{x}(t|t)=\hat{x}(t|t-T)+K_f(t)(y(t)-C(t)\hat{x}(t|t-T))$$

$$P(t|t)=P(t|t-T)-K_f(t)C(t)P(t|t-T)$$

$$\hat{x}(t|t+T)=A\hat{x}(t|t)$$

$$P(t+T|t)=AP(t|t)A^T+R_1(t).$$

Here, $\hat{x}(t|t-T)$ denotes the state prediction, based on data up to time t-T, $\hat{x}(t|t)$ denotes the filter update, based on data up to time t, P(t|t-T) denotes the covariance of the state prediction, based on data up to time t-T, P(t|t) denotes the covariance of the filter update, based on data up time t, and $K_f(t)$ denotes the time variable Kalman gain matrix. The matrices A and C(t) are given by:

$$A = \begin{pmatrix} 1 & 0 \\ 0 & 1 \end{pmatrix}$$

$$C(t) = \begin{pmatrix} 1 & 0 \\ 1 & 1 \end{pmatrix}$$

The detection problem can e.g. be set up as follows. First the two hypotheses are defined as:

$$H_0: -c < b(t) < c$$

$$H_1: b(t) \geq c \text{ or } b(t) \leq c$$

Then noting that the filtering step above has generated a sufficient statistics, it follows that the test statistics becomes:

$$\Lambda = \frac{sup(L(b(t)): -c < b(t) < c)}{sup(L(b(t)): -\infty < b(t) < \infty)}.$$

Above c is a parameter and L( ) denotes the likelihood which is readily obtained from the filtered information assuming Gaussian distribution functions. $H_0$ may be rejected if $\Lambda$<threshold. In this case the load prediction may resort to using the measured SIR as previously explained.

In a present embodiment the load factor for the dedicated channels, LDCH (t), is calculated from filtered $SIR_k^{filt}(t)$, where k indicates the user. The filtered SIR is generated as $$SIR_k^{filt}(t)=\text{lowPassfiltOwnUuLoad} \cdot SIR_k(t)+(1-\text{lowPassFiltOwnUuLoad}) \cdot SIR_k^{filt}(t-T_{EUL})$$

Here $SIR_k(t)$ is the measured SIR, lowPassfiltOwnU-ULoad is a filter constant, and where $T_{EUL}$ is the EUL sampling period. The C/I, $\gamma_k(t)$, of user k is then calculated as:

$$\gamma_k(t) = \frac{SIR_k^{filt}(t)}{SF} \cdot \left(1 + \left(\frac{\beta_{E-DPCCH}}{\beta_C}\right)^2 + n_{Codes}\left(\frac{\beta_{E-DPDCH}}{\beta_C}\right)^2 + \left(\frac{\beta_{HS-DPCCH}}{\beta_C}\right)^2\right)$$

Above SF denotes the spreading factor, $\beta_C$ is the beta factor for the control channel, $\beta_{E-DPCCH}$ is the beta factor for the enhanced control channel, $\beta_{E-DPDCH}$ is the beta factor for the enhanced data channel, $\beta_{HS-DPCCH}$ is the HS control channel for the E-DCH-user, and $n_{codes}$ denotes the number of codes used.

The load factors can then be computed as follows:

$$L_{DCH}(t) = \sum_{\substack{DCH \\ users\,k}} \frac{\gamma_k(t)}{1+(1-ownInterfEul) \cdot \gamma_k(t)}$$

$$L_{E-DCH}(t) = \sum_{\substack{E-DCH \\ users\,k}} \frac{\gamma_k(t)}{1+(1-ownInterfEul) \cdot \gamma_k(t)}$$

$$L_{DPCCH}(t) = \sum_{\substack{E-DCH \\ users\,k\,with \\ no\,E-DPDCH \\ power}} \frac{\gamma_k(t)}{1+(1-ownInterfEul) \cdot \gamma_k(t)}$$

$$L_{HSDPCCH}(t) = \sum_{\substack{E-DCH \\ users\,k\,with \\ HSDPCCH \\ power}} \frac{\gamma_k(t)}{1+(1-ownInterfEul) \cdot \gamma_k(t)}$$

Above, ownInterfEul is the self interference factor.

According to embodiments of the present invention, the SIR target is used in the formula above instead of (filtered) SIR, except when the difference between SIR target and measured SIR is bigger than a threshold value. Then, the measured SIR is used instead.

Figure 4:
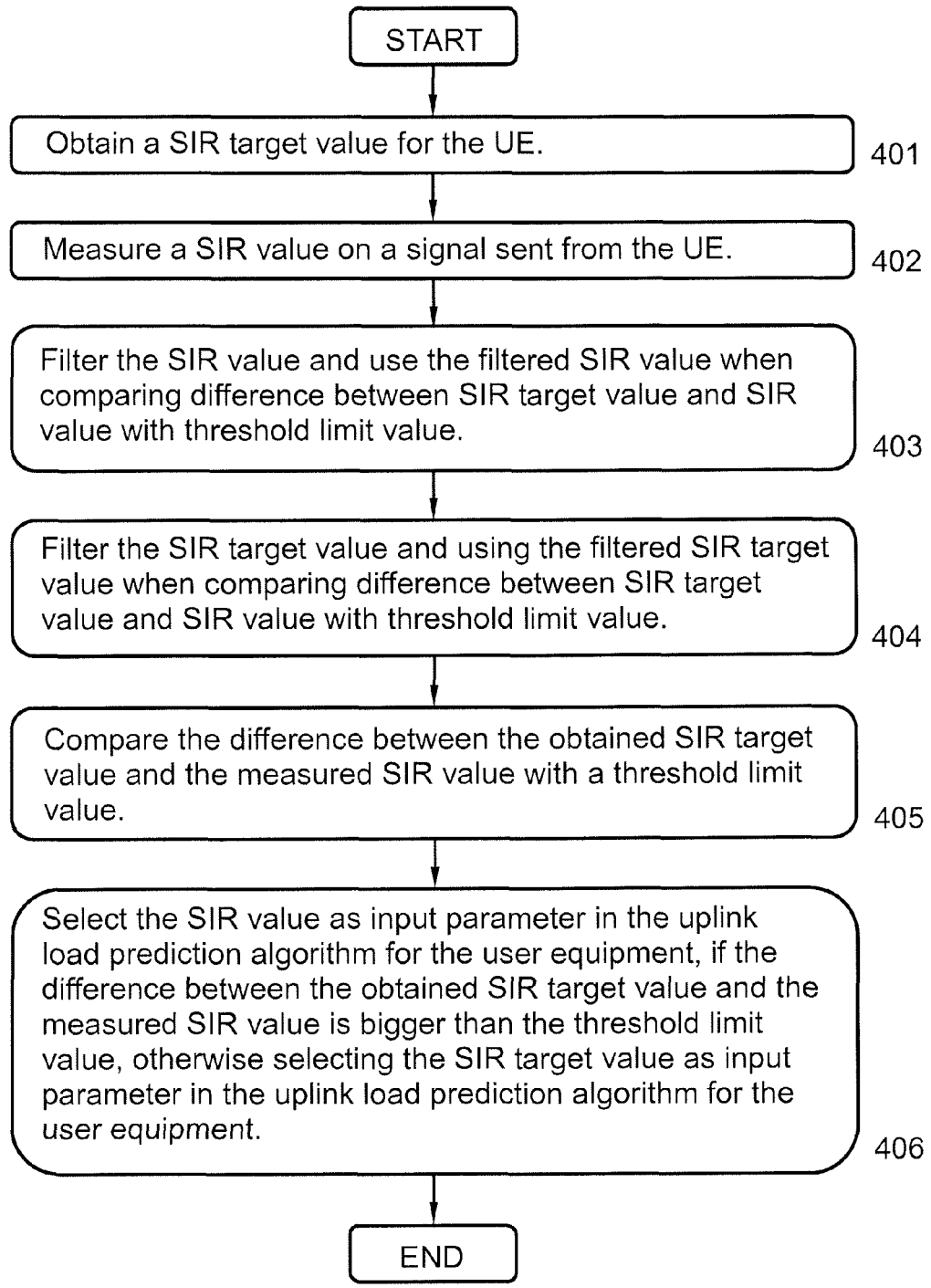
FIG. 4 is a flow chart illustrating embodiments of the present method in a base station.

FIG. 4 is a flow chart illustrating embodiments of method steps 401-406 performed in a base station 110. The method steps 401-406 aims at providing an input parameter in an algorithm for predicting uplink load in a cell 130 in a wireless communication system 100. The cell 130 comprises at least one user equipment 120.

The base station 110 and the user equipment 120 may be comprised in the wireless communication system 100 e.g. a WCDMA radio network. The base station 110 may be e.g. a node B, according to some embodiments.

To appropriately determining a binary value of information data received from a user equipment 120, the method may comprise a number of method steps 401-406.

It is however to be noted that some of the described method steps are optional and only comprised within some embodiments. Further, it is to be noted that the method steps 401-406 may be performed in a somewhat different chronological order and that some of them, e.g. step 401 and step 402, may be performed simultaneously or in a rearranged chronological order. The method may comprise the following steps:

Step 401

A Signal-to-Interference Ratio (SIR) target value associated with the user equipment 120 is obtained. The SIR target may be obtained from the control unit 140, which control unit 140 may be a Radio Network Controller (RNC).

Step 402

A Signal-to-Interference Ratio (SIR) value is measured on a signal sent from the user equipment 120.

Step 403

This step is optional and may only be performed within some embodiments.

The SIR value may be filtered and the filtered SIR value may be used when comparing the difference between the SIR target value and the SIR value with the threshold limit value. The filtering may be performed by applying a Kalman filtering, according to some embodiments.

Step 404

This step is optional and may only be performed within some embodiments.

The SIR target value may be filtered and the filtered SIR target value may be used when comparing the difference between the SIR target value and the SIR value with the threshold limit value. The filtering may be performed by applying a Kalman filtering, according to some embodiments.

Step 405

The difference between the obtained SIR target value and the measured SIR value is compared with a threshold limit value.

Step 406

The SIR value is selected as input parameter in the uplink load prediction algorithm for the user equipment 120, if the difference between the obtained SIR target value and the measured SIR value is bigger than the threshold limit value. Otherwise the SIR target value is selected as input parameter in the uplink load prediction algorithm for the user equipment 120.

Figure 5:
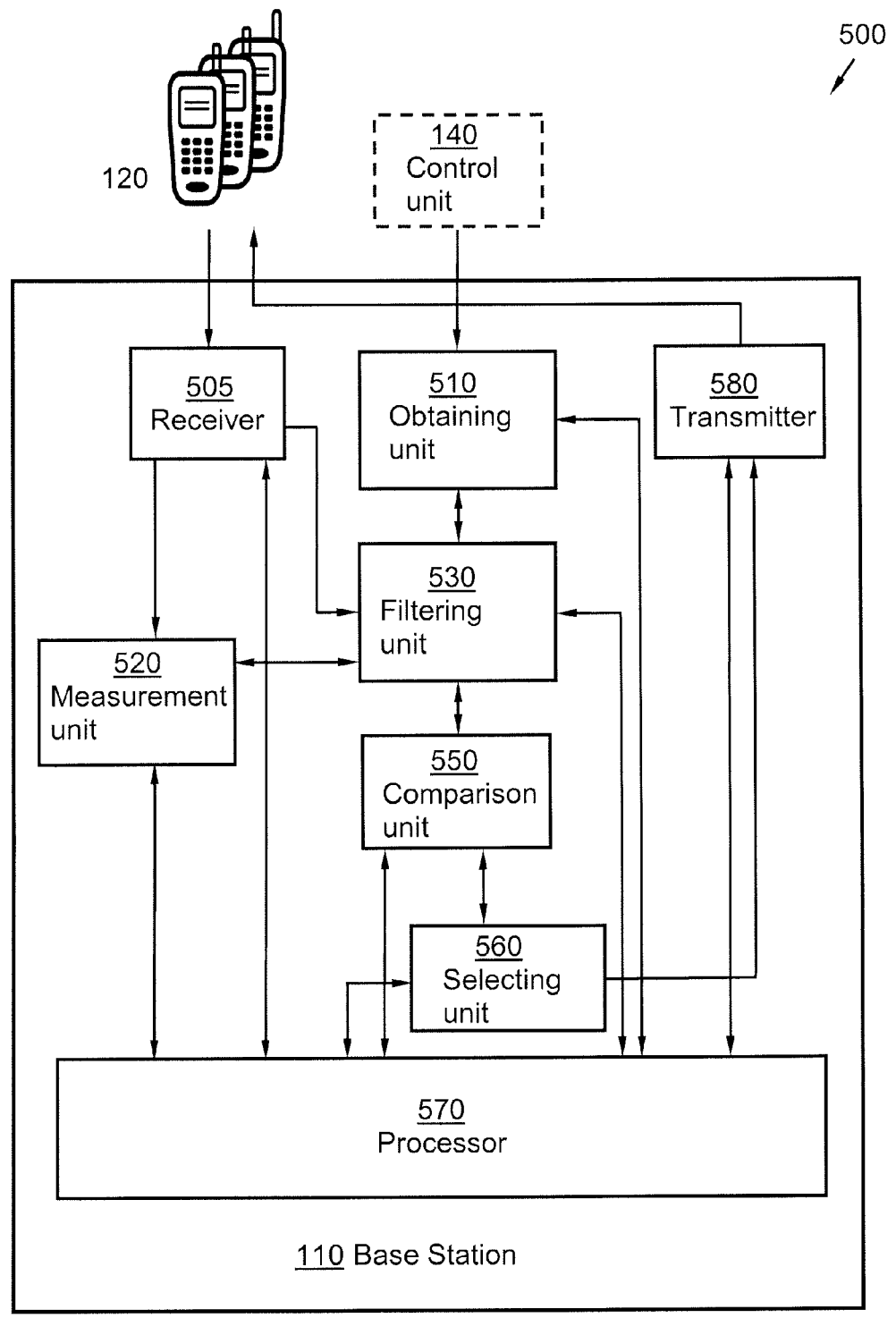
FIG. 5 is a schematic block diagram illustrating an exemplary embodiment of the present base station arrangement.

FIG. 5 schematically illustrates an arrangement 500 in a base station 110. The arrangement 500 is adapted to perform any, some or all of the method steps 401-406 in order to provide an input parameter in an algorithm for predicting uplink load in a cell 130 in a wireless communication system 100. The cell 130 comprises at least one user equipment 120.

The base station 110 and a control unit 140 may be comprised in a wireless communication system 100. The wireless communication system 100 may be e.g. e.g. a WCDMA radio network. The base station 110 may be e.g. a node B, according to some embodiments.

In order to perform the method steps 401-406 correctly, the base station arrangement 500 comprises e.g. an obtaining unit 510. The obtaining unit 510 is configured to obtain a Signal-to-Interference Ratio (SIR) target value associated with the user equipment 120. The SIR target may be obtained from the control unit 140, which control unit 140 may be an RNC. Also, the arrangement 500 further comprises, in addition, a measurement unit 520. The measurement unit 520 is configured to measure a Signal-to-Interference Ratio (SIR) value on a signal sent from the user equipment 120. Further, the arrangement 500 in addition also comprises a comparison unit 550. The comparison unit 550 is configured to compare the difference between the obtained SIR target value and the measured SIR value with a threshold limit value. The arrangement 500 further also comprises a selecting unit 560, configured to select the SIR value as input parameter in the uplink load prediction algorithm for the user equipment 120, if the difference between the obtained SIR target value and the measured SIR value is bigger than the threshold limit value, otherwise selecting the SIR target value as input parameter in the uplink load prediction algorithm for the user equipment 120.

Further, according to some embodiments, the base station arrangement 500 may comprise a receiver 505. The receiver 505 may be configured to receive signals from the user equipment 120. In addition, the arrangement 500 may comprise a processor 570. The processor 570 may be configured to process the received information data by applying an algorithm.

The processor 570 may be represented by e.g. a Central Processing Unit (CPU), a microprocessor, or other processing logic that may interpret and execute instructions. The processor 570 may perform all data processing functions for inputting, outputting, and processing of data including data buffering and device control functions, such as call processing control, user interface control, or the like.

Furthermore, the arrangement 500 may according to some embodiments comprise a filtering unit 530, configured to filter the SIR value and/or the SIR target value. The filtering unit 530 may comprise Kalman filtering.

Also, in further addition, the arrangement 500 may comprise a transmitter 580. The transmitter 580 is configured to transmit wireless signals.

It is to be noted that any internal electronics of the base station 110 and/or the base station arrangement 500, not completely necessary for understanding the present method according to the method steps 401-406 has been omitted from FIG. 5, for clarity reasons.

Further, it is to be noted that some of the described units 505-580 comprised within the arrangement 500 in the base station 110 are to be regarded as separate logical entities but not with necessity separate physical entities. To mention just one example, the receiving unit 505 and the transmitter 580 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110 and the user equipment 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 401-406 in the base station 110 may be implemented through one or more processors 570 in the base station 110, together with computer program code for performing the functions of the present method steps 401-406. Thus a computer program product, comprising instructions for performing the method steps 401-406 in the base station 110 may provide an input parameter in an algorithm for predicting uplink load in a cell 130 in a wireless communication system 100, when the computer program product is loaded into the processor 570.

The computer program product mentioned above may be provided for instance in the form of a data carrier carrying computer program code for performing the method steps according to the present solution when being loaded into the processor unit 570. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection.

Further, a computer program product comprising instructions for performing at least some of the method steps 401-406 may be used for implementing the previously described method in the base station 110 for provide an input parameter in an algorithm for predicting uplink load in a cell 130 in a wireless communication system 100, when the computer program product is loaded into the processor 570.

Figure 6A:
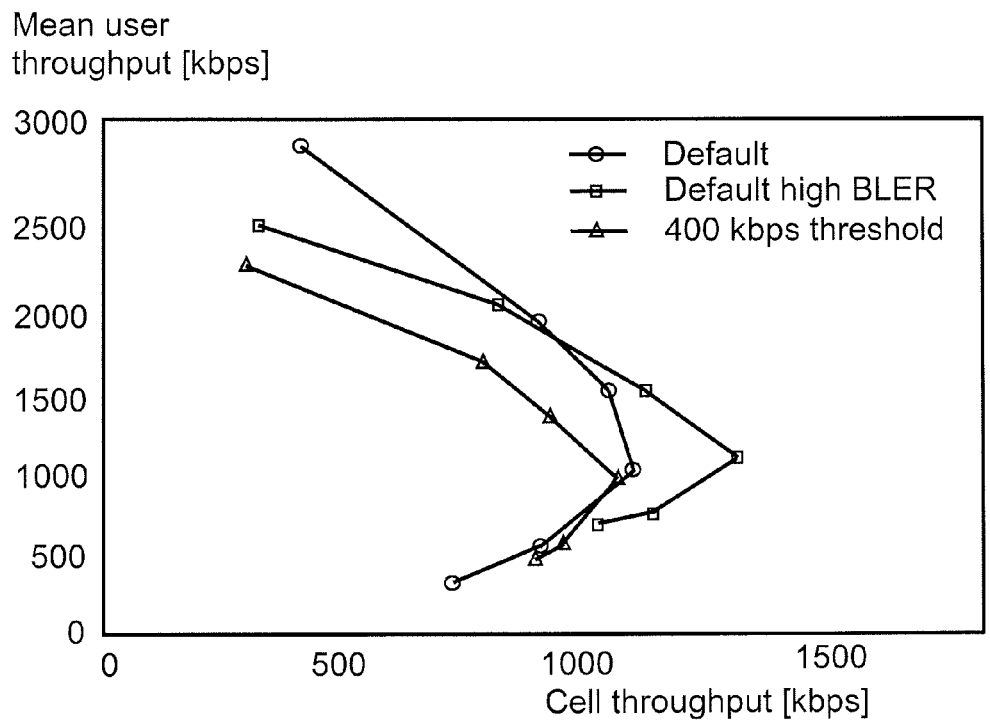
FIG. 6A is a schematic block diagram illustrating examples of user throughput and cell throughput under certain conditions.

FIG. 6A illustrates an example of the capacity when using the measured SIR for load prediction purposes. The measured SIR is replaced with target SIR.

The capacity impact of a replacement of the SIR of a user equipment 120 with the SIR target of the same user was obtained by high fidelity system simulations. The results appear in FIG. 6A and FIG. 6B, from which it is evident that there is an advantage by using SIR target instead of the measured SIR.

When doing load prediction, the invention hence teaches that the measured SIR should preferably be replaced by the SIR target.

Figure 6B:
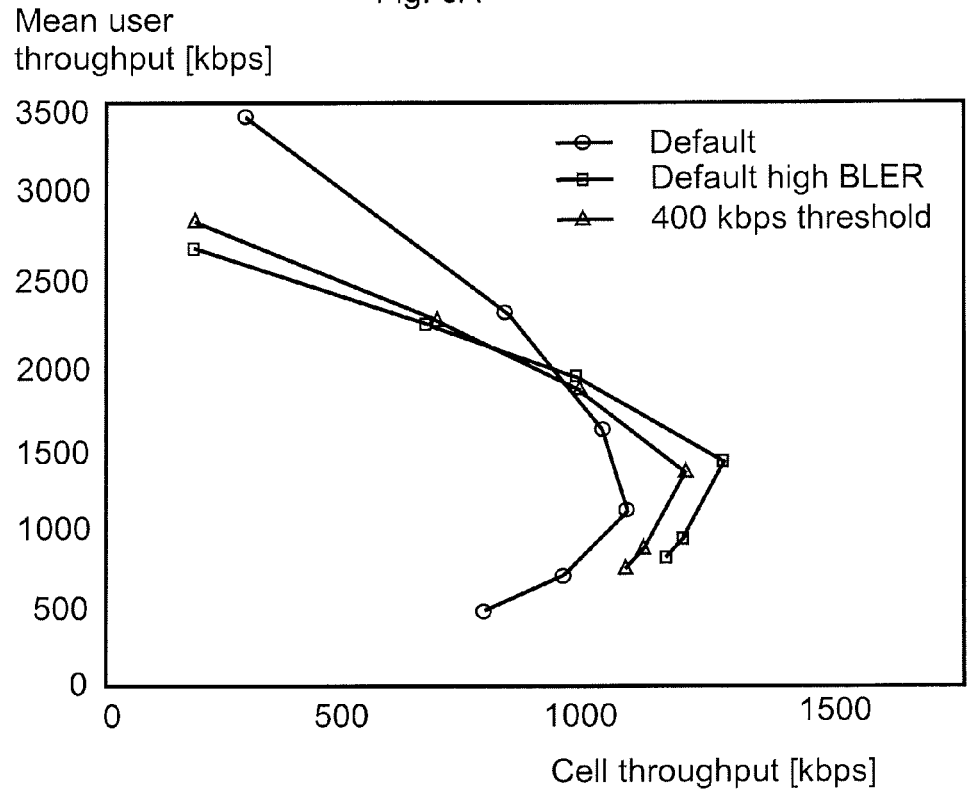
FIG. 6B is a schematic block diagram illustrating examples of user throughput and cell throughput under certain conditions.

FIG. 6B illustrates of the capacity when using the SIR target for load prediction purposes.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

Further by means of example and in order to simplify the comprehension, the term SIR has been consistently used in this text when describing a Signal to noise and Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Signal to Interference and Noise Ratio (SINR) or an inversion of the ratio, like Interference to Signal Ratio, (ISR). Any of these or similar ratios may be used in the context of this description instead of the SIR.

The invention claimed is:

1. A method in a base station for providing an input parameter in an algorithm for predicting uplink load in a cell in a wireless communication system, the cell comprises at least one user equipment, the method comprising the steps of:
    obtaining a Signal-to-Interference Ratio "SIR" target value associated with the user equipment,
    measuring a Signal-to-Interference Ratio "SIR" value on a signal sent from the user equipment,
    comparing the difference between the obtained SIR target value and the measured SIR value with a threshold limit value,
    selecting the measured SIR value as input parameter in the uplink load prediction algorithm for the user equipment, if the difference between the obtained SIR target value and the measured SIR value is bigger than the threshold limit value, thereby considering the user equipment to be in a soft handover situation,
    otherwise selecting the obtained SIR target value as input parameter in the uplink load prediction algorithm for the user equipment.

2. The method according to claim 1, wherein the method comprises the further step of:
    filtering the measured SIR value and using the filtered SIR value when comparing the difference between the obtained SIR target value and the measured SIR value with the threshold limit value.

3. The method according to claim 2, wherein the step of filtering is performed by applying a Kalman filtering.

4. The method according to claim 3, wherein the wireless communication system is based on Wideband Code Division Multiple Access "WCDMA" technology.

5. The method according to claim 2, wherein the method comprises the further step of:
    filtering the obtained SIR target value and using the filtered SIR target value when comparing the difference between the obtained SIR target value and the measured SIR value with the threshold limit value.

6. The method according to claim 2, wherein the wireless communication system is based on Wideband Code Division Multiple Access "WCDMA" technology.

7. The method according to claim 1, wherein the method comprises the further step of:
    filtering the obtained SIR target value and using the filtered SIR target value when comparing the difference between the obtained SIR target value and the measured SIR value with the threshold limit value.

8. The method according to claim 7, wherein the step of filtering is performed by applying a Kalman filtering.

9. The method according to claim 7, wherein the wireless communication system is based on Wideband Code Division Multiple Access "WCDMA" technology.

10. The method according to claim 1, wherein the wireless communication system is based on Wideband Code Division Multiple Access "WCDMA" technology.

11. An arrangement in a base station for providing an input parameter in an algorithm for predicting uplink load in a cell in a wireless communication system, the cell comprises at least one user equipment, the arrangement comprising:
    an obtaining unit, configured to obtain a Signal-to-Interference Ratio "SIR" target value associated with the user equipment,
    a measurement unit, configured to measure a Signal-to-Interference Ratio "SIR" value on a signal sent from the user equipment,
    a comparison unit, configured to compare the difference between the obtained SIR target value and the measured SIR value with a threshold limit value,
    a selecting unit, configured to select the measured SIR value as input parameter in the uplink load prediction algorithm for the user equipment, if the difference between the obtained SIR target value and the measured SIR value is bigger than the threshold limit value, thereby considering the user equipment to be in a soft handover situation,
    otherwise selecting the SIR target value as input parameter in the uplink load prediction algorithm for the user equipment.

12. The arrangement according to claim 11, wherein the arrangement further comprises a filtering unit, configured to filter the SIR value and/or the SIR target value.

* * * * *